United States Patent
Shemer et al.

(10) Patent No.: US 10,895,988 B2
(45) Date of Patent: Jan. 19, 2021

(54) MEASURING LATENCY IN STORAGE AREA NETWORKS

(71) Applicant: EMC IP Holding Company LLC, Hopkinton, MA (US)

(72) Inventors: Jehuda Shemer, Kfar Saba (IL); Arieh Don, Newton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 2 days.

(21) Appl. No.: 16/372,928

(22) Filed: Apr. 2, 2019

(65) Prior Publication Data
US 2020/0319801 A1    Oct. 8, 2020

(51) Int. Cl.
G06F 3/06       (2006.01)
H04L 29/08     (2006.01)
H04L 12/841   (2013.01)

(52) U.S. Cl.
CPC ............ *G06F 3/0611* (2013.01); *G06F 3/067* (2013.01); *G06F 3/0653* (2013.01); *G06F 3/0659* (2013.01); *H04L 29/08549* (2013.01); *H04L 47/283* (2013.01)

(58) Field of Classification Search
CPC .. G06F 3/067; H04L 29/08549; H04L 47/283
See application file for complete search history.

(56) References Cited

U.S. PATENT DOCUMENTS

| | | | | |
|---|---|---|---|---|
| 7,447,198 B1* | 11/2008 | Banks | ............. | H04L 45/00 370/386 |
| 8,868,870 B1* | 10/2014 | Vemuri | ............. | G06F 3/0617 709/217 |
| 10,243,823 B1* | 3/2019 | Bharadwaj | ......... | H04L 67/1097 |
| 2004/0017806 A1* | 1/2004 | Yazdy | ............. | H04L 49/357 370/389 |
| 2006/0159112 A1* | 7/2006 | Sundaram | ......... | H04L 47/283 370/412 |
| 2006/0215656 A1* | 9/2006 | Shirogane | ......... | H04L 47/283 370/389 |
| 2008/0147893 A1* | 6/2008 | Marripudi | ......... | G06F 3/0659 710/5 |
| 2012/0017121 A1* | 1/2012 | Carlson | ............. | H04L 43/16 714/43 |
| 2012/0099443 A1* | 4/2012 | Makishima | ......... | H04L 43/10 370/248 |

(Continued)

OTHER PUBLICATIONS

American National Standards Institute. "Fibre Channel Storage Network Ping (SNPing)." Dec. 2007. Rev. 0.61.*

(Continued)

*Primary Examiner* — Nathan Sadler
(74) *Attorney, Agent, or Firm* — Krishnendu Gupta; Dorothy Wu Chiang (57) ABSTRACT

A method, system, and computer program product for measuring latency in storage area networks comprising receiving a command from a node at a first time by a target in a storage area network, evaluating the command by the target, and returning a reply to the node from the target at a second time, wherein a difference between the second time and the first time is less than a time period indicative of a processing delay in the target, wherein the reply is considered a good status reply.

23 Claims, 6 Drawing Sheets

(56) References Cited

U.S. PATENT DOCUMENTS

| | | | | |
|---|---|---|---|---|
| 2013/0179993 A1* | 7/2013 | Sandler | ................... | G06F 21/60 |
| | | | | 726/30 |
| 2015/0046668 A1* | 2/2015 | Hyde, II | ............... | G06F 3/0689 |
| | | | | 711/162 |
| 2015/0319245 A1* | 11/2015 | Nishihara | ............. | G06F 3/0647 |
| | | | | 709/213 |
| 2020/0110692 A1* | 4/2020 | Senin | .................. | G06F 11/3037 |

OTHER PUBLICATIONS

American National Standards Institute. "Fibre Channel Storage Network Ping (SNPing)." May 2008. INCITS 443-2008.*

* cited by examiner

FIG. 6

MEASURING LATENCY IN STORAGE AREA NETWORKS

BACKGROUND

Technical Field

This application relates to storage area networks.

Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

Such a data storage system typically includes processing circuitry and a set of disk drives (disk drives are also referred to herein as simply "disks" or "drives"). In general, the processing circuitry performs load and store operations on the set of disk drives on behalf of the host devices. In certain data storage systems, the disk drives of the data storage system are distributed among one or more separate disk drive enclosures (disk drive enclosures are also referred to herein as "disk arrays" or "storage arrays") and processing circuitry serves as a front-end to the disk drive enclosures. The processing circuitry presents the disk drive enclosures to the host device as a single, logical storage location and allows the host device to access the disk drives such that the individual disk drives and disk drive enclosures are transparent to the host device.

Disk arrays are typically used to provide storage space for one or more computer file systems, databases, applications, and the like. For this and other reasons, it is common for disk arrays to be structured into logical partitions of storage space, called logical units (also referred to herein as LUs or LUNs). For example, at LUN creation time, storage system may allocate storage space of various storage devices in a disk array to be presented as a logical volume for use by an external host device. This allows a disk array to appear as a collection of separate file systems, network drives, and/or volumes. Disk arrays may also include groups of physical disks that are logically bound together to represent contiguous data storage space for applications.

It is desirable to efficiently manage and monitor data storage systems for a variety of different reasons, such as, for example, to obtain and measure latency and round trip time in the data storage system that is not affected by internal processing delays.

SUMMARY OF THE INVENTION

Embodiments of this disclosure relate to a method, system, and computer program product for measuring latency in storage area networks comprising receiving a command from a node at a first time by a target in a storage area network, evaluating the command by the target, and returning a reply to the node from the target at a second time, wherein a difference between the second time and the first time is less than a time period indicative of a processing delay in the target, wherein the reply is considered a good status reply. In some embodiments, the command comprises a Small Computer System Interface (SCSI) Vendor Unique (VU) command. In some embodiments, the command received from the node at the first time by the target is associated with a sent time from the node, the reply returned from the target to the node is associated with a received time at the node, and the received time at the node minus the sent time from the node is a round-trip time.

BRIEF DESCRIPTION OF THE DRAWINGS

Features and advantages of the present technique will become more apparent from the following detailed description of exemplary embodiments thereof taken in conjunction with the accompanying drawings in which.

DETAILED DESCRIPTION OF EMBODIMENT(S)

Described below is a technique for use in, for example, measuring latency in storage systems, which technique may be used to provide, among other things, receiving a command from a node at a first time by a target in a storage area network, evaluating the command by the target, and returning a reply to the node from the target at a second time, wherein a difference between the second time and the first time is less than a time period indicative of a processing delay in the target, wherein the reply is considered a good status reply.

A data storage system to be managed and monitored may use the Small Computer System Interface (SCSI) protocol which is known within the art of computer science. In brief, SCSI is a standard specifying the interface between devices that were originally controllers and peripherals in computer systems. The SCSI architecture is a client-server architecture wherein clients and servers are called "initiators" and "targets," respectively. Initiators send service requests to targets and receive responses from targets. A target is a collection of logical units. Each logical unit contains a device server, one or more task sets (queues), and a task manager.

SCSI recognizes two types of requests: device-server requests and task-management requests. The device server processes the device-server commands while the task manager is responsible for task management.

A device-server request is a SCSI command for execution on a logical unit, such as a block read/write command. Each device-server request defines a unit of work for a logical unit. Within a logical unit, a task represents a unit of work.

A SCSI task is an execution context a target creates for a SCSI command or a series of linked SCSI commands. A new task is created for each single command, while the same task is used for all the commands in a series of linked commands, also referred to as a "chain of commands." A task persists until a command (or a series of linked commands) completion response is sent or until the task is ended by a task management function or exception condition. The initiator sends the next linked command in a series of linked commands only after the current command completes. That is, only one pending command exists per task. From the initiator's point of view, the device server is not multi-tasking; a task executes until it completes. This property allows initiators to implement, for example, read-modify-write commands using linked commands.

Task management requests control the execution of tasks. Examples of task management requests include aborting a task, clearing an exception condition and resetting a logical unit. The task manager manages task queues and serves task management requests.

Both initiators and targets have ports to communicate with their counterparts. The requests and responses are sent through and received from these ports. An initiator or target has one or more ports. Each port has a unique identifier. Each request includes its initiator and target port identifiers. These identifiers are in a "*nexus* object" in the request. In addition, the *nexus* object optionally contains an identifier for the logical unit and the task. The logical unit identifier is included if the request is destined for a particular logical unit. Similarly, the task identifier is included if the request is for a specified task.

SCSI is described more fully in the SCSI-3 Architecture Model (SAM), available at www.ansi.org as ANSI X3.270-1996, in the SCSI Architecture Model-2 (SAM-2), available at ftp://ftp.t10.org/t10/drafts/sam2/sam2r22.pdf, and in the references mentioned therein.

Data storage systems may be linked to facilitate the formation of Storage Area Networks (SANs) having increased capabilities and improved performance. SANs that include servers and data storage devices may be interconnected over longer distances, e.g. over IP networks, such as the Internet.

The SCSI protocol defines certain commands that initiators can use to check the status of targets. One such command is a SCSI Inquiry or INQ command. The INQ command can be used to, for example, identify the type and make of a particular target. Typically, the INQ command can get enqueued by the target for later handling and then returns a relatively large amount of information. Another such command is a SCSI Test Unit Ready or TUR command. The TUR command can be used as a heartbeat, i.e., to see if a target is online. The TUR command may get enqueued by the target for later handling. The SCSI protocol also allows for the use of SCSI Vendor Unique (VU) commands. A VU command can be used, for example, to implement customized behavior for a device (e.g., ordering a device to come online or go offline) or to send customized data to or from a device.

Generally, measuring SAN Round-Trip Time (RTT), also known as latency, and specifically the RTT delay is a basic operation for efficient SAN communications. Such measurement can be used to improve load balancing, multi-pathing, routing and other applications. For example, in a replication environment (e.g., using EMC Corporation's RecoverPoint and RecoverPoint Appliances (RPA) for replication) in which a splitter is used to split IOs directed to a storage array and an RPA, the splitter can measure the RTT to various target RPAs and this measurement information can be used to select a particular target RPA to split IOs to. As another example, in synchronized replication over fiber channel (where latency is critical), selecting the correct path has significant implications on the production application performance. As used through this disclosure, the term "path" is to be interpreted broadly.

Typically, it has been difficult to measure the latency or round-trip time from a host to a storage array in a SAN. SAN management tools can be used to measure the RTT of frames—but they do not typically have an end-to-end way (i.e., from host port to array port and back) to measure the RTT of a SCSI command in the SCSI context. For example, in a multipath I/O environment, path selection software (e.g., MPIO) can scan the initiator-target paths, send a SCSI TUR command to a target device, and use the RTT in scheduling further I/Os to that device. However, the TUR commands (or INQ commands in that use-case) may be queued by the storage array if the storage device the commands are directed to is very busy. This queueing can lead to latency or delay in responding to commands within the storage array. Such queueing increases the RTT for these commands and thus is not a reliable way to measure RTT.

SAN RTT is important in determining SAN fabric RTT balance. For example, if a host has multiple initiators zoned to array ports—it is preferable that these paths' RTT will be approximately the same, whereby a "path" refers to a logical connection between a host port and a target port. If one path has a considerable higher RTT than another, the system will prefer to send I/Os on the path with the lower RTT. However, if the path with lower RTT fails, the host will be forced to use a path with a higher RTT and the user experience will be impacted. Thus, it is beneficial for the user to be able to inspect the SAN RTT on all paths between the host and the array. As another example, the splitter in a RecoverPoint environment should use an accurate mapping of RTT to optimize split RPA selection, path selection, and the minimization of RTT for synchronous replication. The additional device queue delay in conventional methods of measuring RTT skews the measured results which can lead to non-optimal choices and impact production application performance.

Typically, such queueing or other delay—for example, within storage arrays—in a SAN can be due to a variety of factors. For example, when a host in a SAN with an associated storage array comes online, the host sends a SCSI TUR command to each of a range of addresses in order to determine which address corresponds with an actual device. If an actual device exists at a particular address, the storage array replies to the host with a "good" status, typically a 0 in the SCSI protocol. However, the storage array may queue the SCSI TUR command to handle at a later time. If no device exists at a particular address, the storage array immediately replies with a non-zero chk_cond (i.e. a check condition), which is also known as "LUN Not Supported." In this case, the storage array cannot queue the command because a queue is only associated with an actual device.

Typically, as another example, in an environment with many hosts, when the hosts come online within a short time period (e.g., within one to three minutes), a large number of SCSI TUR commands can get queued as each host queries the specified address range of each storage associated storage array. This is also known as a "storm." In this way, commands that get queued for later handling are even more delayed because of the presence of the "storm" of TUR commands on the queues.

By contrast, in at least some implementations in accordance with the technique described below, a method and system are provided for an improved way to measure delay or latency within a storage array in a storage area network. And in at least some implementations in accordance with the technique described below, a method and system are provided for an improved way to measure RTT in a storage area network. Thus, in at least one embodiment of the current technique, a user of a system is able to better measure delay or latency within a storage array in a storage area network by the system enabling receiving a command from a node at a first time by a target in a storage area network, evaluating the command by the target; and returning a reply to the node from the target at a second time, wherein a difference between the second time and the first time is less than a time period indicative of a processing delay in the target, wherein the reply is considered a good status reply. And in at least one embodiment of the current technique, a user of a system is able to better measure RTT by the system enabling the command received from the node at the first time by the target being associated with a sent time from the node, the reply returned from the target to the node being associated with a received time at the node, and the received time at the node minus the sent time from the node being a round-trip time.

In at least some implementations in accordance with the techniques as described herein, the use of the way to measure delay/latency or RTT in a storage area network can provide one or more of the following advantages: improve RTT measurements, remove device queue overhead, ease of implementation of the techniques, allows better mapping of SAN latencies (e.g., by being better able to determine what is contributing to delays), improving the efficiency of communications, improving replication, and applications on the SAN. For example, in accordance with the techniques described herein, it may be discovered that the round-trip time for one path is 0.5 milliseconds, and the round-trip time for another path is 2 milliseconds. In this example, the path with the 0.5 millisecond round-trip time will be preferable.

Figure 1:
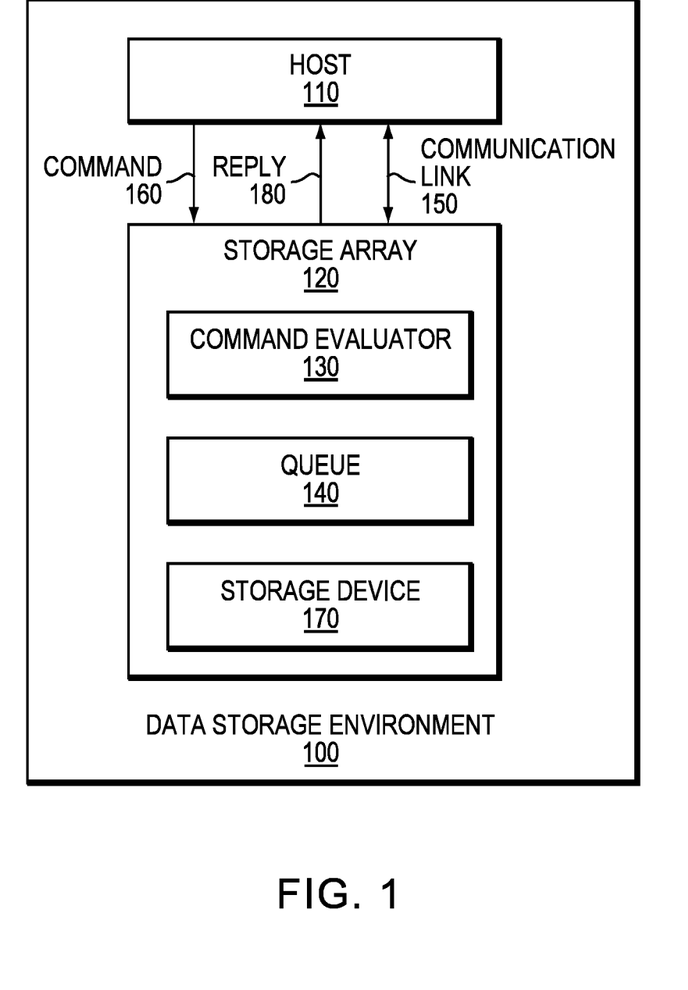
FIG. 1 is a simplified block diagram of an example system for measuring latency, in accordance with an embodiment of the present disclosure.

FIG. 1 depicts an example embodiment of a system that may be used in connection with performing the techniques described herein. In some embodiments, a data storage environment 100 (e.g., a SAN) includes a host 110, sometimes known as a node, in communication with a storage array 120 through a communication link 150. In some embodiments, the host may be a replication appliance. In some embodiments, the storage array 120 may include multiple storage arrays. In some embodiments, the storage array 120 has a storage device 170. The storage device 170 can be a hard disk, flash memory, or other kind of storage device. In some embodiments, the storage device 170 includes multiple storage devices. In some embodiments, the communication link 150 is implemented using fiber channel, although other implementations are possible. In some embodiments, the communication link 150 is implemented as a fabric. In some embodiments, the host 110 sends one or more commands 160 to the storage array 120 through communication link 150. In some embodiments, host 110 communicates with the storage array 120 using the SCSI protocol. In this way, the host 110 can send one or more SCSI commands 160 to the storage array 120, with the host 110 being also sometimes known as an initiator and the storage array 120 being also sometimes known as a target.

In some embodiments, the storage array 120 has an associated command evaluator 130 for evaluating received commands 160. In some embodiments, the command evaluator 130 is implemented as a software module within the storage array 120, though other implementations are possible, e.g., the command evaluator may be implemented in a separate instrumentation. In some embodiments, the storage array may have an associated queue 140. In some embodiments, the queue 140 is used to store certain commands 160 for later handling, sometimes known as enqueueing a command. In some embodiments, the time between enqueueing the command 160 and the later handling of the command 160 is known as processing delay. In some embodiments, whether or not to enqueue a command 160 is based on the command 160 itself. For example, if the command 160 is a SCSI INQ command, the command evaluator 130 may indicate that the command 160 should be enqueued, which results in the command 160 being placed in the queue 140. As another example, if the command 160 is a SCSI TUR command, the command evaluator 130 may indicate that the command 160 should be enqueued, which results in the command 160 being placed in the queue 140. In some embodiments, the queue 140 is implemented as a First-In, First-Out queue, sometimes known as a FIFO queue. In some embodiments, there may be one or more other commands 160 already in the queue 140. In this case, the most recently enqueued command 160 will be handled after some or all of the other commands 160 already in the queue 140 are handled. In some embodiments, handling the command 160 results in a reply 180 being sent back to the host 110 through the communication link 150. In some embodiments, the reply 180 may indicate success, sometimes known as a good status and sometimes implemented as a 0, or failure, sometimes known as a bad status and sometimes implemented as a non-zero or a check condition ("chk_cond").

Measuring Latency Using a Vendor Unique (VU) Command

In some embodiments, it is desirable to measure or monitor the latency in the data storage environment 100 relatively accurately using a specific command, such that the effect of processing delay upon the measurement is minimized. In some embodiments, the host 110 sends a type of command 160, for example a SCSI Vendor Unique (VU) command, to the storage array 120, such that the command 160 will not be enqueued for later handling by the storage array 120. Rather, the storage array 120 receives the command 160 and the command evaluator 130, in response to evaluating the command 160 (e.g., the SCSI VU command)

indicates that a good status reply 180 should be returned from the storage array 120 to the host 110. In some embodiments, the command evaluator 130 treats the SCSI VU command 160 as if the SCSI VU command were a command 160 directed to a non-supported logical unit within the data storage environment 100. In this way, by eliminating or at least minimizing or reducing the effect of processing delay (as may be caused by enqueueing the command 160), and by returning a good status reply 180, a more accurate measure of RTT or latency within the data storage environment can be measured. In some embodiments, the received command 160 is associated with a sent time from the host 110. For example, in some embodiments, the host 110 can keep track of or store the time the host 110 sent the command 160 (e.g., the SCSI VU command) to the storage array 120. In another example, in some embodiments, the command 160 can include the time that the command 160 was sent from the host 110. In some embodiments, the returned status reply 180 is associated with a time received at the host 110. For example, in some embodiments, the host 110 can keep track of the time that the host 110 receives the status reply 180. In some embodiments, the difference between the time that the host 110 receives the status reply 180 and the time the host 110 sends the command 160 is known as a round-trip time. In some embodiments, the host 110 measures the round-trip time.

In some embodiments, the storage array may be busy, for example, because of many other commands 160 present in the queue 140. In some embodiments, the presence of many commands 160 in the queue 140 may be caused by a "storm" as described above when many hosts 110 in the data storage environment 100 come online within a short time period. In some embodiments, the presence of many commands 160 in the queue 140 may be caused by a "drain" problem, in which a storage array 120 cannot handle data as quickly as another node, such as a switch (not pictured), in the data storage environment 100 can send data to the storage array 120. For example, the storage array 120 could be sent millions of commands but be unable to handle them quickly enough. Yet the host 110 can still get an accurate measure of the latency of the storage area network when sending a command 160, for example the SCSI VU command, to the storage array 120, because the command evaluator 130 will indicate that a good status reply 180 should be returned from the storage array 120 to the host 110 without the command 160 being placed in the queue 140 for later handling and without a bad status reply 180 being returned, indicating a problem.

Figure 2:
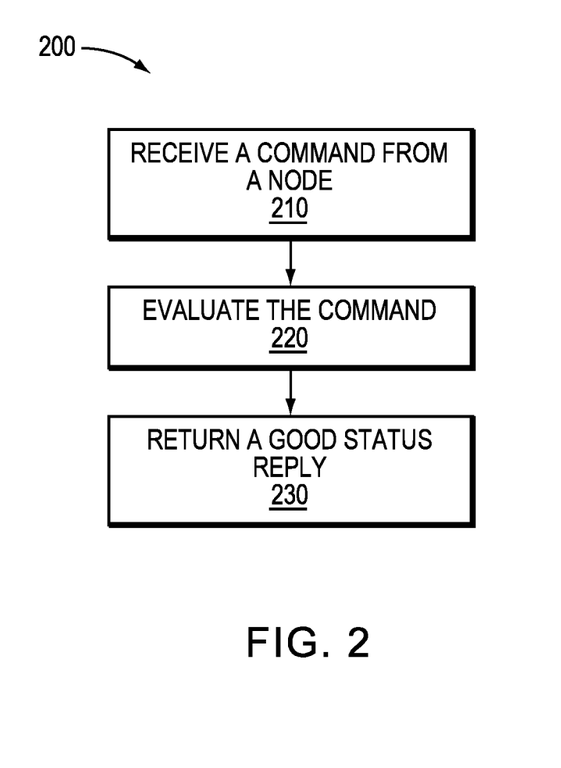
FIG. 2 is a simplified illustration of an example flow diagram for measuring latency, in accordance with an embodiment of the present disclosure.

Referring to FIG. 2, shown is a flow diagram 200 illustrating an example embodiment of a method that may be used in connection with performing the techniques described herein. With reference also to FIG. 1, in some embodiments of the current technique, a target, for example the storage array 120 receives a command 160 from an initiator, for example a host 110 at a first time, t0 (Step 210). In some embodiments, the command 160 is a SCSI VU command. The command 160 is evaluated by a command evaluator 130 associated with the storage array target 120 (Step 220). In response to evaluating the command 160, the storage array target 120 returns a good status reply 180 to the host 110 (Step 230) at a second time, t1, wherein t1−t0 is less than a time period indicative of a processing delay in the storage array 120, for example due to the need to place the command 160 in a queue 140 for later handling, as described above. In some embodiments, the received command 160 is associated with a sent time from the host 110. For example, in some embodiments, the host 110 can keep track of or store the time the host 110 sent the command 160 (e.g., the SCSI VU command) to the storage array 120. In another example, in some embodiments, the command 160 can include the time that the command 160 was sent from the host 110. In some embodiments, the returned status reply 180 is associated with a time received at the host 110. For example, in some embodiments, the host 110 can keep track of the time that the host 110 receives the status reply 180. In some embodiments, the difference between the time that the host 110 receives the status reply 180 and the time the host 110 sends the command 160 is known as a round-trip time. In some embodiments, the host 110 measures the round-trip time.

Figure 3:
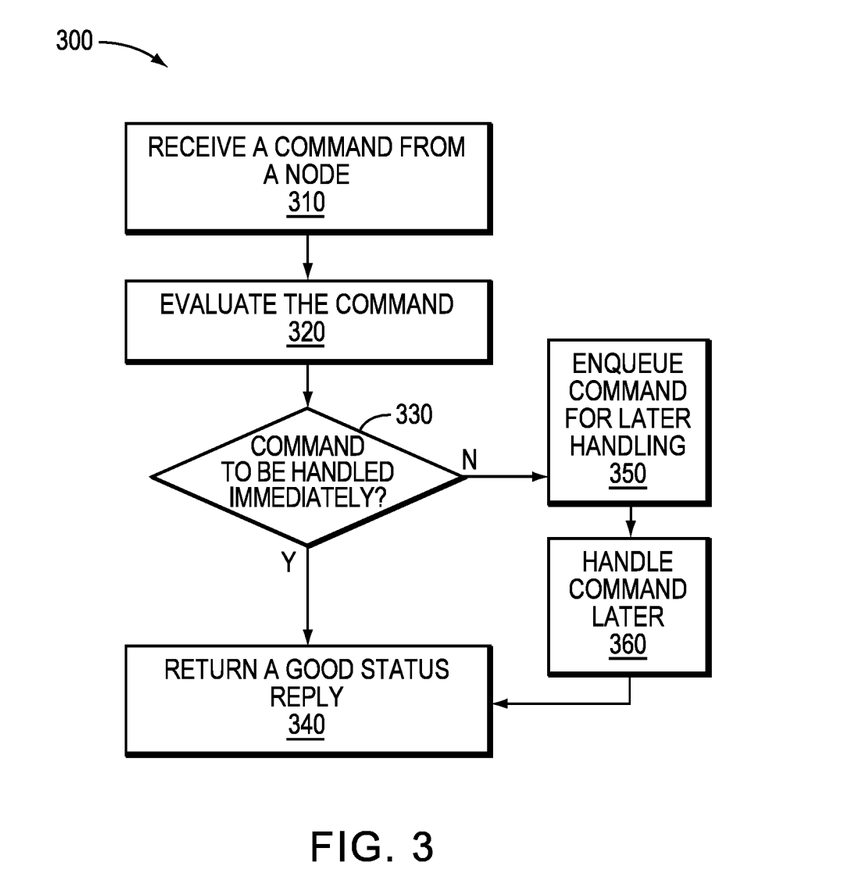
FIG. 3 is a simplified illustration of a further example flow diagram for measuring latency, in accordance with an embodiment of the present disclosure.

Referring to FIG. 3, shown is a flow diagram 300 illustrating an example embodiment of a method that may be used in connection with performing the techniques described herein. With reference also to FIG. 1, in some embodiments of the current technique, a target, for example the storage array 120 receives a command 160 from an initiator, for example a host 110 at a first time t0 (Step 310). In some embodiments, the command 160 is a SCSI VU command. The command 160 is evaluated by a command evaluator 130 associated with the storage array target 120 (Step 320). The command 160 is checked, for example, by the command evaluator 130, to see whether the command 160 should be handled immediately, without enqueueing the command 160 for later handling (Step 330). If it is determined that the command 160 should be handled immediately, the storage array target 120 returns a good status reply 180 to the host 110 at a second time, t1 (Step 340). If it is instead determined that the command 160 should not be handled immediately, for example when the command 160 is a SCSI INQ or SCSI TUR command, then the command 160 is enqueued for later handling, for example, by the command 160 being placed in a queue 140 (Step 350). After the command 160 is placed in the queue 140, the command 160 is handled later (Step 360). The storage array target 120 returns a good status reply 180 to the host 110 at a third time, t2 (Step 340), such that t2−t0 is greater than t1−t0, because of, for example the later handling of the command 160, the command 160 having been enqueued. In some embodiments, the received command 160 is associated with a sent time from the host 110. For example, in some embodiments, the host 110 can keep track of or store the time the host 110 sent the command 160 (e.g., the SCSI VU command) to the storage array 120.

In another example, in some embodiments, the command 160 can include the time that the command 160 was sent from the host 110. In some embodiments, the returned status reply 180 is associated with a time received at the host 110. For example, in some embodiments, the host 110 can keep track of the time that the host 110 receives the status reply 180. In some embodiments, the difference between the time that the host 110 receives the status reply 180 and the time the host 110 sends the command 160 is known as a round-trip time. In some embodiments, the host 110 measures the round-trip time.

Figure 4:
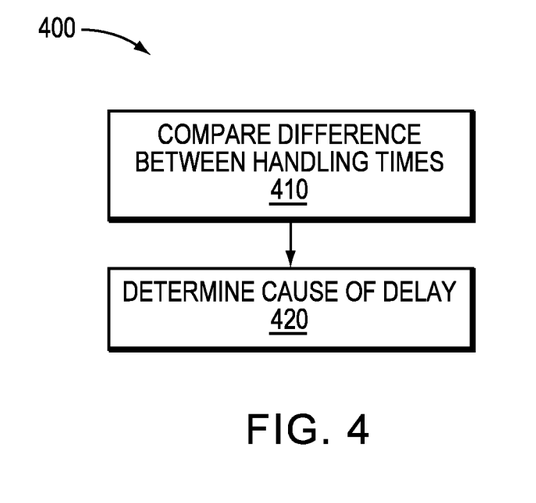
FIG. 4 is a simplified illustration of a further example flow diagram for measuring latency, in accordance with an embodiment of the present disclosure.

Referring to FIG. 4, shown is a flow diagram 400 illustrating an example embodiment of a method that may be used in connection with performing the techniques described herein. With reference also to FIG. 1, in some embodiments of the current technique, the handling times of the storage array target 120 are compared by comparing the difference between t2−t0 and t1−t0 (t0, t1, and t2 as shown above with reference to FIG. 2) (Step 410). In some embodiments, the comparison is performed by the host 110. In some embodiments, based on the difference, a likely cause of a delay in RTT is determined (Step 420). In some embodiments, the determining is performed by the host 110. For example, if the difference between t2−t0 and t1−t0 is relatively small (e.g., 5–10%), the RTT delay is likely dominated by the SAN (e.g., overall networking delay). If the difference between t2–t0 and t1–t0 is relatively large (e.g., more than 10%), the processing time of the storage device (or the port on the storage array) is likely source of the delay. Thus, in the case of the relatively large difference, using a different path to the same port will probably not yield any performance improvements. Thus, the initiator should either seek paths accordingly (e.g., paths to a different port) or throttle the IO transmissions. In some embodiments, the host 110 determines a likely cause of a delay in RTT by comparing the round-trip times, according to the techniques described above. For example, the host 110 compares the round-trip times of a) sending a command 160—e.g., a SCI VU command—to be handled by a target storage array 180 without enqueueing the command 160, and b) sending another command 160—e.g., a SCSI INQ or SCSI TUR command—to be handled by the target storage array 180 that may cause enqueueing of the command 160. In some embodiments, if the difference between the two round-trip times is relatively small (e.g., 5–10%), the RTT delay is likely dominated by the SAN (e.g., overall networking delay). If the difference between the two round-trip times is relatively large (e.g., more than 10%), the processing time of the storage device (or the port on the storage array) is likely source of the delay. Thus, in the case of the relatively large difference, using a different path to the same port will probably not yield any performance improvements. Thus, the initiator should either seek paths accordingly (e.g., paths to a different port) or throttle the IO transmissions.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium.

Figure 5:
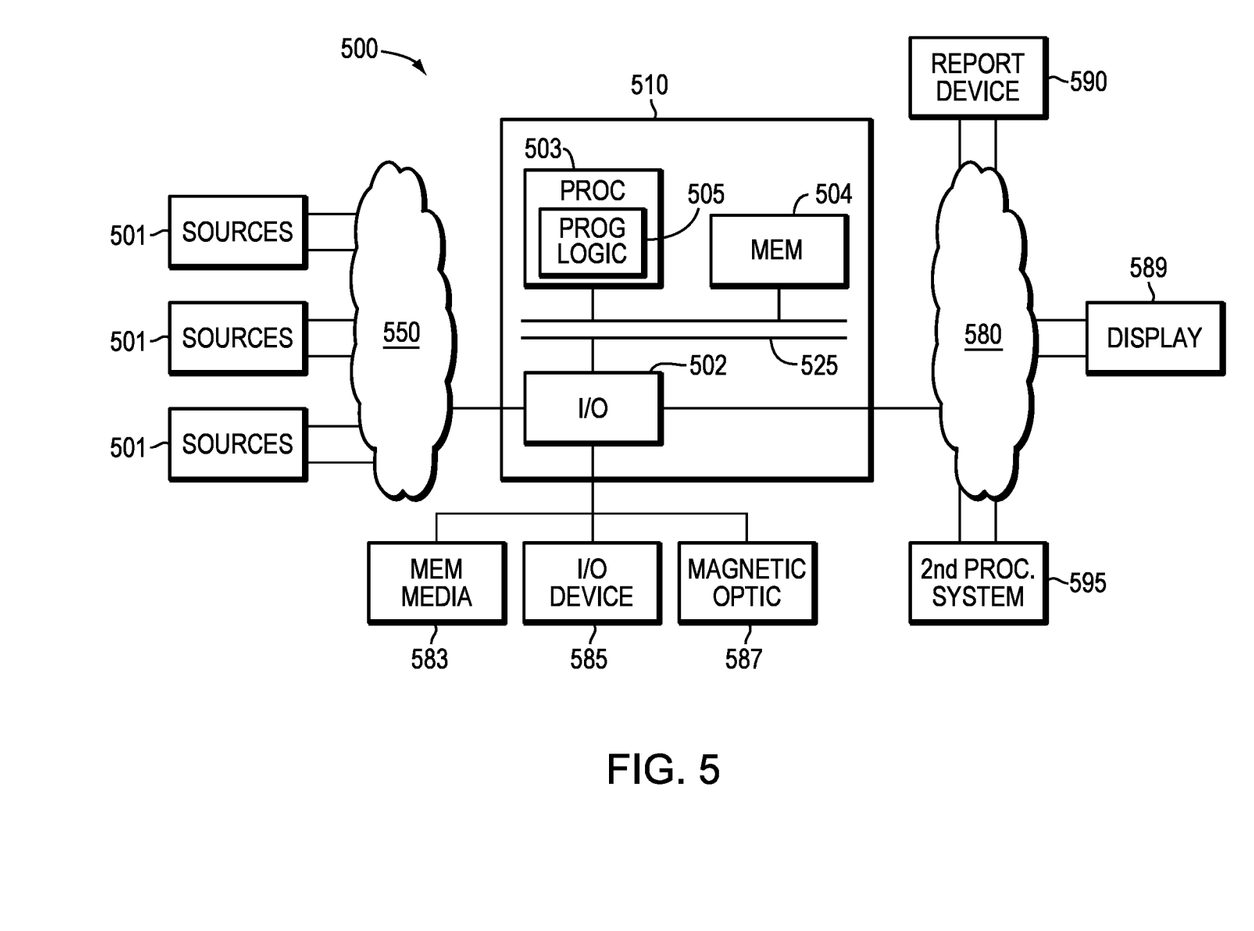
FIG. 5 is an example of an embodiment of an apparatus that may utilize the techniques described herein, in accordance with an embodiment of the present disclosure.

FIG. 5 is a block diagram illustrating an apparatus, such as a computer 510 in a network 500, which may utilize the techniques described herein according to an example embodiment of the present invention. The computer 510 may include one or more I/O ports 502, a processor 503, and memory 504, all of which may be connected by an interconnect 525, such as a bus. Processor 503 may include program logic 505. The I/O port 502 may provide connectivity to memory media 583, I/O devices 585, and drives 587, such as magnetic drives, optical drives, or Solid State Drives (SSD). The I/O port 502 may also provide connectivity to sources 501 over a computer network 550, as well as a display 589, report device 590, or second processing system 595, over another network 580. When the program code is loaded into memory 504 and executed by the computer 510, the machine becomes an apparatus for practicing the invention. When implemented on one or more general-purpose processors 503, the program code combines with such a processor to provide a unique apparatus that operates analogously to specific logic circuits. As such, a general purpose digital machine can be transformed into a special purpose digital machine.

Figure 6:
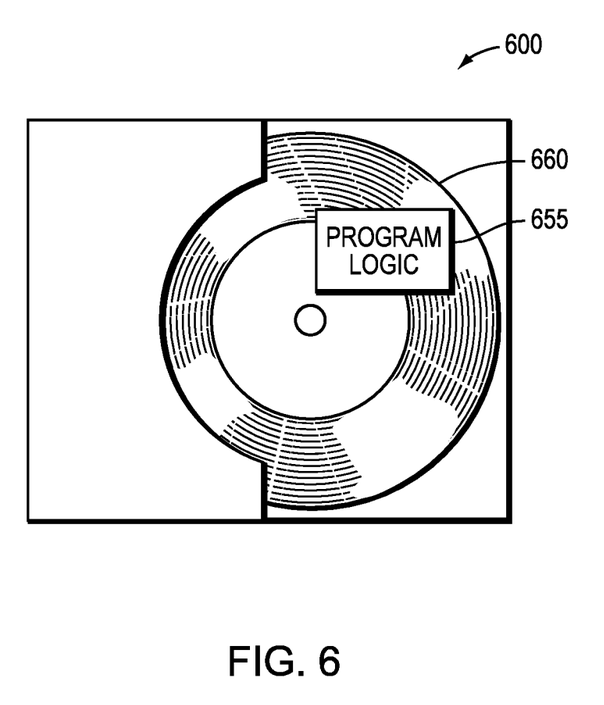
FIG. 6 is an example of a method embodied on a computer readable storage medium that may utilize the techniques described herein, in accordance with an embodiment of the present disclosure.

FIG. 6 is a block diagram illustrating a method embodied on a computer readable storage medium 660 that may utilize the techniques described herein according to an example embodiment of the present invention. FIG. 6 shows Program Logic 655 embodied on a computer-readable medium 660 as shown, and wherein the Logic is encoded in computer-executable code configured for carrying out the methods of this invention and thereby forming a Computer Program Product 600. Program Logic 655 may be the same logic 505 on memory 504 loaded on processor 503 in FIG. 4. The program logic may be embodied in software modules, as modules, as hardware modules, or on virtual machines. The logic for carrying out the method may be embodied as part of the aforementioned system, which is useful for carrying out a method described with reference to embodiments shown in, for example, FIGS. 1-4. For purposes of illustrating the present invention, the invention is described as embodied in a specific configuration and using special logical arrangements, but one skilled in the art will appreciate that the device is not limited to the specific configuration but rather only by the claims included with this specification.

Furthermore, as will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for measuring latency in storage area networks, the method comprising:

receiving a Small Computer System Interface (SCSI) command from a node at a first time by a target in a storage area network;

evaluating the command by the target to determine that the command should be handled without being enqueued; and returning a reply to the node from the target at a second time, wherein a difference between the second time and the first time is less than a time period indicative of a processing delay in the target, wherein the reply is considered a good status reply.

2. The method of claim 1, wherein the command comprises a Vendor Unique (VU) command.

3. The method of claim 1, wherein the time period indicative of the processing delay in the target is associated with the target enqueueing the command.

4. The method of claim 1, wherein evaluating the command comprises treating the command as being directed to a non-supported logical unit within the storage area network.

5. The method of claim 1, wherein the command is different from another command sent by one or more nodes within the storage area network in response to the one or more nodes coming online.

6. The method of claim 1, further comprising:
receiving a second command from the node by the target;
evaluating the second command by the target;
enqueueing the second command by the target; and
returning a second reply at a third time, wherein the second reply is considered a good status reply, wherein the third time is greater than the second time.

7. The method of claim 6, further comprising:
determining whether delay in round trip time is caused by the storage area network or the target.

8. The method of claim 1, wherein the command received from the node at the first time by the target is associated with a sent time from the node, wherein the reply returned from the target to the node is associated with a received time at the node, wherein the received time at the node minus the sent time from the node is a round-trip time.

9. A system, comprising:
a storage area network; and
computer-executable program logic operating in memory, wherein the computer executable logic program enables execution across one or more processors of:
receiving a Small Computer System Interface (SCSI) command from a node at a first time by a target in the storage area network;
evaluating the command by the target to determine that the command should be handled without being enqueued; and
returning a reply to the node from the target at a second time, wherein a difference between the second time and the first time is less than a time period indicative of a processing delay in the target, wherein the reply is considered a good status reply.

10. The system of claim 9, wherein the command comprises a Vendor Unique (VU) command.

11. The system of claim 9, wherein the time period indicative of the processing delay in the target is associated with the target enqueueing the command.

12. The system of claim 9, wherein evaluating the command comprises treating the command as being directed to a non-supported logical unit within the storage area network.

13. The system of claim 9, wherein the command is different from an other command sent by one or more nodes within the storage area network in response to the one or more nodes coming online.

14. The system of claim 9, wherein the computer executable logic program further enables execution across the one or more processors of:
receiving a second command from the node by the target;
evaluating the second command by the target;
enqueueing the second command by the target; and
returning a second reply at a third time, wherein the second reply is considered a good status reply, wherein the third time is greater than the second time.

15. The system of claim 14, wherein the computer executable logic program further enables execution across the one or more processors of:
determining whether delay in round trip time is caused by the storage area network or the target.

16. The system of claim 9, wherein the command received from the node at the first time by the target is associated with a sent time from the node, wherein the reply returned from the target to the node is associated with a received time at the node, wherein the received time at the node minus the sent time from the node is a round-trip time.

17. A computer program product comprising:
a non-transitory computer readable medium encoded with computer executable program code, the code enabling execution across one or more processors of:
receiving a Small Computer System Interface (SCSI) command from a node at a first time by a target in a storage area network;
evaluating the command by the target to determine that the command should be handled without being enqueued; and
returning a reply to the node from the target at a second time, wherein a difference between the second time and the first time is less than a time period indicative of a processing delay in the target, wherein the reply is considered a good status reply.

18. The computer program product of claim 17, wherein the command comprises a Vendor Unique (VU) command.

19. The computer program product of claim 17, wherein the time period indicative of the processing delay in the target is associated with the target enqueueing the command.

20. The computer program product of claim 17, wherein evaluating the command comprises treating the command as being directed to a non-supported logical unit within the storage area network.

21. The computer program product of claim 17, wherein the command is different from an other command sent by one or more nodes within the storage area network in response to the one or more nodes coming online.

22. The computer program product of claim 17, wherein the code is further enabling execution across the one or more processors of:
receiving a second command from the node by the target;
evaluating the second command by the target;
enqueueing the second command by the target; and
returning a second reply at a third time, wherein the second reply is considered a good status reply, wherein the third time is greater than the second time.

23. The computer program product of claim 17, wherein the command received from the node at the first time by the target is associated with a sent time from the node, wherein the reply returned from the target to the node is associated with a received time at the node, wherein the received time at the node minus the sent time from the node is a round-trip time.

* * * * *